(12) United States Patent
Byun

(10) Patent No.: US 8,507,126 B2
(45) Date of Patent: Aug. 13, 2013

(54) SECONDARY BATTERY

(75) Inventor: Sangwon Byun, Yongin-si (KR)

(73) Assignees: Samsung SDI Co., Ltd., Yongin-si (KR); Robert Bosch GmbH, Stuttgart (DE)

( * ) Notice: Subject to any disclaimer, the term of this patent is extended or adjusted under 35 U.S.C. 154(b) by 214 days.

(21) Appl. No.: 12/945,737

(22) Filed: Nov. 12, 2010

(65) Prior Publication Data

US 2011/0300419 A1    Dec. 8, 2011

(30) Foreign Application Priority Data

Jun. 4, 2010    (KR) .......................... 10-2010-0052883

(51) Int. Cl.
*H01M 2/26*    (2006.01)
(52) U.S. Cl.
USPC ........................... 429/161; 429/163; 429/164
(58) Field of Classification Search
None
See application file for complete search history.

(56) References Cited

U.S. PATENT DOCUMENTS

| | | | |
|---|---|---|---|
| 5,604,051 A * | 2/1997 | Pulley et al. ................. | 429/99 |
| 2006/0019158 A1 | 1/2006 | Mori et al. | |

FOREIGN PATENT DOCUMENTS

| | | | |
|---|---|---|---|
| EP | 2 287 942 A1 | 2/2011 | |
| JP | 11-204006 A | 7/1999 | |
| JP | 2011-204006 | 7/1999 | |
| JP | 2001-148239 | * | 5/2001 |
| JP | 2005-142026 | * | 6/2005 |
| JP | 2005-259574 | * | 9/2005 |
| JP | 2005-267945 | | 9/2005 |
| JP | 2008-218132 | | 9/2008 |

OTHER PUBLICATIONS

Machine translation of JP 2005-259574, retrieved from <http://www19.ipdl.inpit.go.jp/PA1/cgi-bin/PA1INDEX> on Apr. 4, 2013.*
European Search Report dated Aug. 4, 2011, for the European Patent application 11151967.4, 6 pages.
Korean Notice of Allowance dated Feb. 27, 2012 issued in Korean Patent Application No. 10-2010-0052883, 5 pages.
English Machine Translation of JP 2008-218132, published Sep. 18, 2008, 12 pages.
English Machine Translation of JP 2011-204006, published Jul. 30, 1999, 8 pages.
English Machine Translation of JP11-204006A, published Jul. 30, 1999, 8 pages.

* cited by examiner

*Primary Examiner* — Cynthia Walls
(74) *Attorney, Agent, or Firm* — Christie, Parker & Hale, LLP

(57) ABSTRACT

A secondary battery includes an electrode assembly having a first electrode, a second electrode, and a separator located between the first electrode and the second electrode; a first collector plate electrically coupled to the first electrode, wherein the first collector plate has a first fuse hole and includes at least one first reinforcement protrusion having a first reinforcement groove and being spaced from the first fuse hole; a second collector plate electrically coupled to the second electrode; a case housing the electrode assembly, the first collector plate and the second collector plate, the case having an upper opening; and a cap assembly sealing the upper opening of the case.

20 Claims, 10 Drawing Sheets ated the application of the benefit of Korean Patent Application No. 10-2010-0052883 filed on Jun. 4, 2010, the contents of which are incorporated herein by reference in their entirety.

BACKGROUND

1. Field

Aspects of the present invention relate to a secondary battery.

2. Description of the Related Art

In general, unlike primary batteries, which are not chargeable, rechargeable batteries are chargeable and dischargeable. Low-capacity secondary batteries, each comprised of a single unit cell, are widely used in small portable electronic devices, such as mobile phones, camcorders, or the like. On the other hand, large-capacity secondary batteries, each comprised of multiple battery cells, may be used as motor driving power sources, such as a hybrid electric vehicle (HEV) or the like.

A secondary battery may be manufactured in various shapes, e.g., a cylindrical can type, a rectangular or prismatic can type, or the like. The secondary battery may be configured by accommodating an electrode assembly including positive and negative electrode plates and a separator located therebetween within a case together with an electrolyte, and coupling a cap assembly having electrode terminals to the case.

If an internal pressure of a secondary battery rises due to generation of excessive heat or decomposition of an electrolyte, a fire or explosion of the secondary battery may occur. Accordingly, there is a need for a secondary battery having improved safety.

SUMMARY

Aspects of the present invention provide a secondary battery having improved electrical and structural stability.

In one embodiment, a secondary battery is provided including an electrode assembly having a first electrode, a second electrode, and a separator located between the first electrode and the second electrode; a first collector plate electrically coupled to the first electrode, wherein the first collector plate has a first fuse hole and includes at least one first reinforcement protrusion having a first reinforcement groove and being spaced from the first fuse hole; a second collector plate electrically coupled to the second electrode; a case housing the electrode assembly, the first collector plate and the second collector plate, the case having an upper opening; and a cap assembly sealing the upper opening of the case.

The first collector plate may further include a first extending portion contacting the first electrode; a first bent portion extending at an angle from the first extending portion; a first fuse portion extending from the first bent portion, the first fuse portion including the first fuse hole and the first reinforcement protrusion; and a first connecting portion extending from the first fuse portion.

Additionally, in one embodiment, the secondary battery of claim 1, further includes a first electrode terminal electrically coupled to the first collector plate and protruding through the cap assembly; and a second electrode terminal electrically coupled to the second collector plate and protruding through the cap assembly. The cap assembly includes a cap plate sealing an open upper end of the case and having a short-circuit hole formed thereon, wherein the first electrode terminal and the second electrode terminal protrude therethrough; a first short-circuit plate sealing the short-circuit hole and having a convex shape protruding generally towards the electrode assembly; and a second short-circuit plate electrically coupled to the second electrode terminal and spaced from the first short-circuit plate. In one embodiment, the first reinforcement protrusion extends generally towards the electrode assembly from the first fuse portion.

Additionally, a first insulation member may be located between the first collector plate and the cap assembly, wherein the first insulation member is in the first reinforcement groove. The first reinforcement protrusion may extend from the first fuse portion in a direction generally away from the electrode assembly. Further, a first insulation member may be formed between the first collector plate and the cap assembly, and the outer periphery of the first reinforcement protrusion may be surrounded by the first insulation member.

Further, the second collector plate may have a second fuse hole; and wherein the second collector plate includes at least one second reinforcement protrusion including a second reinforcement groove and spaced from the second fuse hole. The second collector plate further may include a second extending portion contacting the second electrode; a second bent portion extending at an angle from the second extending portion; a second fuse portion extending from the second bent portion and including the second fuse hole and the second reinforcement protrusion; and a second connecting portion extending from the second fuse portion. The first reinforcement protrusion may be a pressure-formed protrusion.

In one embodiment, a secondary battery is provided including an electrode assembly including a first electrode, a second electrode, and a separator between the first electrode and the second electrode; a first collector plate electrically coupled to the first electrode and having a first outer fuse hole and a second outer fuse hole, wherein the first collector plate includes at least one first reinforcement protrusion including a first reinforcement groove, the at least one first reinforcement protrusion being located between and being spaced from the first outer fuse hole and the second outer fuse hole; a second collector plate electrically coupled to the second electrode; a case accommodating the electrode assembly, the first collector plate and the second collector plate and having an opening; and a cap plate sealing the upper opening of the case.

As described above, the secondary battery according to the embodiment of the present invention includes a fuse portion having a fuse hole or an outer fuse hole, thereby preventing over-current from flowing through a collector plate. In other words, the secondary battery according to the embodiment of the present invention may have improved electrical safety.

In addition, the secondary battery according to the embodiment of the present invention includes a reinforcement protrusion having a reinforcement groove spaced from the outer periphery of a fuse portion, thereby reinforcing the strength of the fuse portion. Accordingly, the secondary battery according to the embodiment of the present invention can prevent the fuse portion of a current plate from being bent or damaged due to external impact. In other words, the secondary battery according to the embodiment of the present invention may have improved mechanical safety.

Additional aspects of the invention will be set forth in part in the description which follows.

BRIEF DESCRIPTION OF THE DRAWINGS

The aspects and features of the present invention will be more apparent from the following detailed description in conjunction with the accompanying drawings, in which.

DETAILED DESCRIPTION

Exemplary embodiments will now be described more fully hereinafter with reference to the accompanying drawings; these embodiments are provided so that this disclosure will be thorough and complete, and will fully convey the scope of the invention to those skilled in the art.

A configuration of a secondary battery according to an embodiment of the present invention will now be described.

Figure 1:
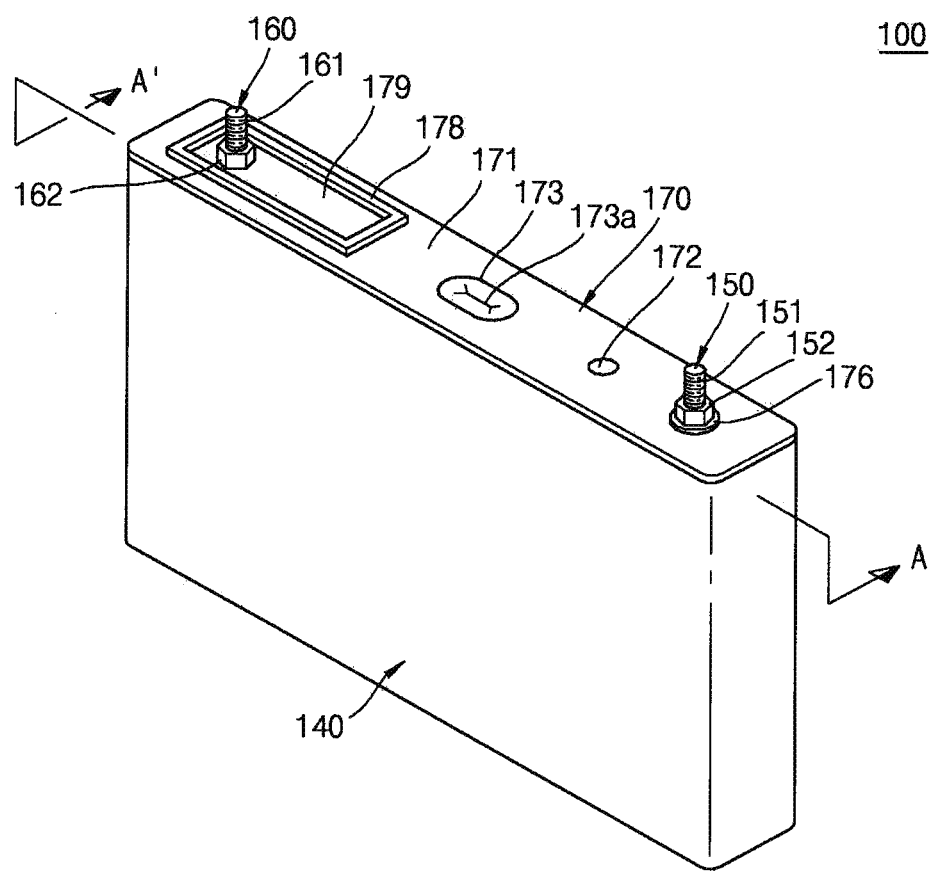
FIG. 1 is a perspective view of a secondary battery according to an embodiment of the present invention.
Figure 2:
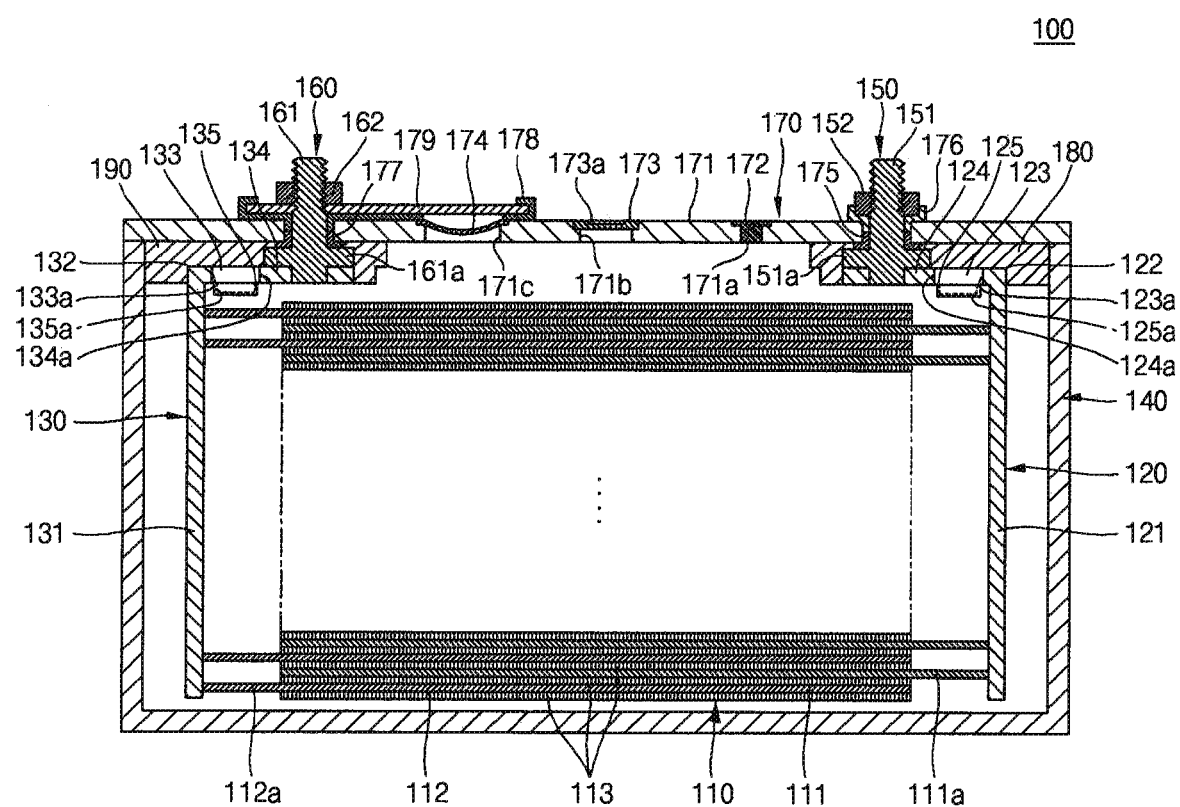
FIG. 2 is a cross-sectional view of the secondary battery, taken along the line A-A' of FIG. 1.
Figure 3A:
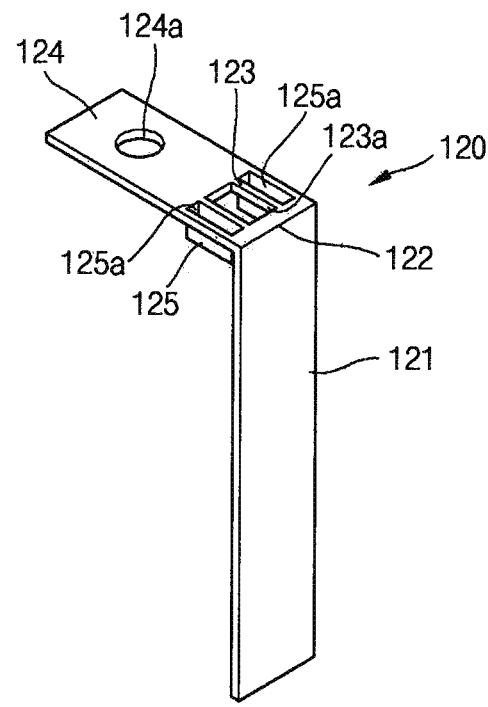
FIGS. 3A and 3B are a perspective view and a left side view illustrating a first collector plate shown in FIG. 2.
Figure 3B:
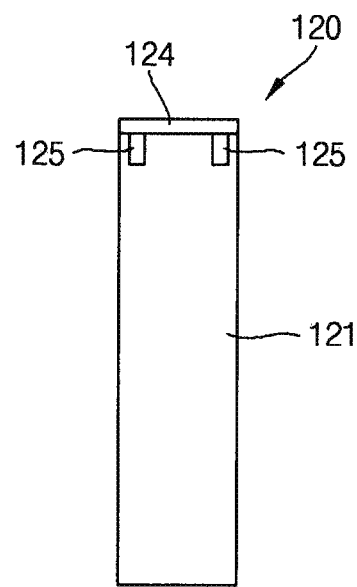

FIG. 1 is a perspective view of a secondary battery according to an embodiment of the present invention, FIG. 2 is a cross-sectional view of the secondary battery, taken along the line A-A' of FIG. 1, and FIGS. 3A and 3B are a perspective view and a left side view illustrating a first collector plate shown in FIG. 2.

Referring to FIGS. 1 and 2, the secondary battery 100 includes an electrode assembly 110, a first collector plate 120, a second collector plate 130, a case 140, a first electrode terminal 150, a second electrode terminal 160, and a cap assembly 170. In addition, the secondary battery 100 includes a first insulation member 180, and a second insulation member 190.

The electrode assembly 110 includes a plate- or bar-shaped first electrode 111, a second electrode 112 and a separator 113 located between the first electrode 111 and the second electrode 112. In addition, the electrode assembly 110 is formed by winding together the first electrode 111, the second electrode 112 and the separator 113 or stacking the first electrode 111, the second electrode 112 and the separator 113. The first electrode 111 may serve as either a positive electrode or a negative electrode, and the second electrode 112 may have a polarity opposite to that of the first electrode 111. In the following description, it is assumed that the first electrode 111 is a positive electrode and the second electrode 112 is a negative electrode.

The first electrode 111 is formed by coating a first electrode active material, such as a transition metal oxide, onto a first electrode collector made of a metal foil, such as aluminum. The first electrode 111 includes a first electrode uncoated portion 111a that is not coated with the first active material. The first electrode uncoated portion 111a corresponds to a path of current flow between the first electrode plate 111 and the outside of the first electrode plate 111. However, the present invention is not limited to the material of the first electrode plate 111 listed herein.

The second electrode 112 is formed by coating a second electrode active material, such as graphite or carbon, onto a second electrode collector made of a metal foil, such as nickel or copper. The second electrode 112 includes a second electrode uncoated portion 112a that is not coated with the second active material. The second electrode uncoated portion 112a corresponds to a path of current flow between the second electrode plate 112 and the outside of the second electrode plate 112. However, the present invention is not limited to the material of the second electrode plate 112 listed herein.

The separator 113, located between the positive and negative electrode plates 111 and 112, serves to prevent short circuits therebetween, and allows for the movement of lithium ions. In addition, the separator 113 may be made of polyethylene, polypropylene, or a composite film of polyethylene and polypropylene. However, the present invention is not limited to the material of the separator 113 listed herein.

Referring to FIGS. 3A and 3B, the first collector plate 120 includes a first extending portion 121, a first bent portion 122, a first fuse portion 123, a first connecting portion 124, and a first reinforcement protrusion 125. In addition, the first collector plate 120 may be made of aluminum.

The first extending portion 121 may be plate-shaped. In addition, the first extending portion 121 contacts the first electrode uncoated portion 111a of the first electrode 111.

The first bent portion 122 is bent and extends from an upper end of the first extending portion 121.

The first fuse portion 123 may be plate-shaped. In addition, the first fuse portion 123 extends from the first bent portion 122. The first fuse portion 123 includes a first fuse hole 123a formed at the inside thereof while passing through the first fuse portion 123. Due to the first fuse hole 123a, the first fuse portion 123 of the first collector plate 120 may have a relatively small vertical sectional area. Therefore, the first fuse portion 123 is formed to have a relatively high resistance value in the first collector plate 120. In such a manner, when over-current flows in the secondary battery 100, the first fuse portion 123 may function as a fuse that prevents current flow by melting the peripheral area of the first fuse hole 123a. Here, when an internal pressure of the secondary battery 100 exceeds a preset pressure level due to excessive heat generated by overcharging of the secondary battery 100 or decomposition of an electrolyte, the over-current may be caused by a contact between a first short-circuit plate 174 and a second short-circuit plate 179, which will later be described. In other words, a risk such as a fire or explosion may be avoided by interrupting charging or discharging of the secondary battery 100.

The first connecting portion 124 extends from the first fuse portion 123. In addition, the first connecting portion 124 may include a first terminal opening 124a formed at the inside thereof.

The first reinforcement protrusion 125 may extend downwardly from the first fuse portion 123. At least one of the first reinforcement protrusion 125 may be formed to be spaced from the peripheral area of the first fuse hole 123a of the first fuse portion 123. In addition, the first reinforcement protrusion 125 may include a first reinforcement groove 125a formed at the inside thereof. The first reinforcement protrusion 125 may be formed at a location spaced from the first fuse hole 123a of the first fuse portion 123 by downwardly applying pressure to the location. The first reinforcement protrusion 125 reinforces the strength of the first fuse portion 123, compared to when the first fuse portion 123 is a simple plate shape, thereby improving the structural stability.

The second collector plate 130 includes a second extending portion 131, a second bent portion 132, a second fuse portion 133, a second connecting portion 134, and a second reinforcement protrusion 135. In addition, the second collector plate 130 may be made of a conductive material such as nickel. The second collector plate 130 may have the same configuration as the first collector plate 120.

The second extending portion 131 may be plate shaped. In addition, the second extending portion 131 contacts the second electrode uncoated portion 112a of the second electrode 112.

The second bent portion 132 is bent and extends from an upper end of the second extending portion 131.

The second fuse portion 133 may be plate shaped. In addition, the second fuse portion 133 may extend from the second bent portion 132. Further, the second fuse portion 133 may include a second fuse hole 133a formed at the inside thereof and extending through the second fuse portion 133. Due to the second fuse hole 133a, the second fuse portion 133 of the second collector plate 130 may have a relatively small vertical sectional area. Accordingly, when over-current flows in the secondary battery 100, the second fuse portion 133 may function as a fuse that prevents current flow by melting the peripheral area of the second fuse hole 133a. Here, the over-current may be caused by a contact between a first short-circuit plate 174 and a second short-circuit plate 179, which will later be described, when an internal pressure of the secondary battery 100 exceeds a preset pressure level due to excessive heat generated by overcharging of the secondary battery 100 or decomposition of an electrolyte. In other words, a risk such as a fire or explosion may be avoided or reduced by interrupting charging or discharging of the secondary battery 100. The second fuse portion 133 may be omitted in an alternative embodiment of the present invention, which will later be described.

The second connecting portion 134 extends from the second fuse portion 133. In addition, the second connecting portion 134 may include a second terminal opening 134a formed at the inside thereof.

The second reinforcement protrusion 135 may downwardly extend from the second fuse portion 133. At least one of the second reinforcement protrusion 135 may be spaced from the peripheral area of the second fuse hole 133a of the second fuse portion 133. In addition, the second reinforcement protrusion 135 may include a second reinforcement groove 135a formed at the inside thereof. The second reinforcement protrusion 135 may be formed a location spaced from the second fuse hole 133a of the first fuse portion 133 by downwardly applying a pressure to the location. The second reinforcement protrusion 135 reinforces the strength of the second fuse portion 134, compared to a case where the second fuse portion 134 is shaped as a simple plate, thereby improving the structural stability. The second reinforcement protrusion 135 may be omitted when the second fuse portion 133 is omitted from the second collector plate 130, which will later be described.

The case 140 may be box-shaped having an upper opening. In addition, the case 140 accommodates the electrode assembly 110, the first collector plate 120 and the second collector plate 130. The case 140 may be made of a conductive metal such as aluminum, aluminum alloy or nickel plated steel. In one embodiment, the inner surface of the case 140 may be processed by insulation treatment to insulate the case from the electrode assembly 110, the first collector plate 120 and the second collector plate 130. In one embodiment, the case 140 may function as an electrode having a polarity, for example, a positive electrode.

The first electrode terminal 150 may include a first bolt portion 151 and a first nut portion 152. The first electrode terminal 150 is electrically connected to the first collector plate 120. In other words, a first flange portion 151a provided in the first bolt portion 151 is seated on the first connecting portion 124, and a bottom end of the first bolt portion 151 may be coupled to a first terminal opening 124a of the first connecting portion 124. The first nut portion 152 allows the first bolt portion 151 to be securely coupled to a cap assembly 170 to be described later. The first electrode terminal 150 may allow the first electrode 111 to be electrically connected to an external device.

The second electrode terminal 160 may include a second bolt portion 161 and a second nut portion 162. The second electrode terminal 160 is electrically connected to the second collector plate 130. In other words, a second flange portion 161a provided in the second bolt portion 161 is seated on the second connecting portion 134, and a bottom end of the second bolt portion 161 may be coupled to a second terminal opening 134a of the second connecting portion 134. The second nut portion 162 allows the second bolt portion 161 to be securely coupled to the cap assembly 170 to be described later. The second electrode terminal 160 may allow the second electrode 112 to be electrically connected to an external device.

The cap assembly 170 may include a cap plate 171, a plug 172, a vent plate 173, a first short-circuit plate 174, a first gasket 175, a connection member 176, a second gasket 177, an insulation plate 178, and a second short-circuit plate 179.

The cap plate 171 may be plate-shaped. In addition, the cap plate 171 may seal an open upper end of the case 140. Further, the first electrode terminal 150 may be formed at one side of the cap plate 171 and may protrude through the cap plate 171. In addition, the second electrode terminal 160 may be formed at the other side of the cap plate 171 and may protrude through the cap plate 171. The cap plate 171 may also include an electrolyte injection hole 171a protruding through the secondary battery 100, a vent hole 171b, and a short-circuit hole 171c. In addition, the cap plate 171 may have the same polarity as the first electrode 111, that is, a positive polarity.

The plug 172 seals the electrolyte injection hole 171a of the cap plate 171.

The vent plate 173 is formed in the vent hole 171b of the cap plate 171. In addition, the vent plate 173 seals the vent hole 171b. Further, the vent plate 173 includes a notch portion 173a, so that it may be opened if internal pressure of the case 140 and the cap assembly 170 exceed a preset pressure level.

The first short-circuit plate 174 is formed in short-circuit hole 171c of the cap plate 171 and seals the short-circuit hole 171c. In one embodiment, the first short-circuit plate 174 is a downwardly convex plate (i.e., extending generally towards the electrode assembly). In addition, if internal pressure of the case 140 and the cap assembly 170 exceed a preset level, the first short-circuit plate 174 may be inverted to be upwardly convex (i.e., to extend generally away from the electrode assembly). Here, the first short-circuit plate 174 has the same polarity as the cap plate 171.

The first gasket 175 is formed between the first electrode terminal 150 and the cap plate 171 and seals a gap between the first electrode terminal 150 and the cap plate 171. The first gasket 175 may prevent external moisture from infiltrating the secondary battery 100 or an electrolyte contained within the secondary battery 100 from leaking to the outside of the secondary battery 100. The first gasket 175 may be made of an insulating material.

The connection member 176 is formed such that the first electrode terminal 150 is inserted between the first electrode terminal 150 and the cap plate 171. In addition, the connection member 176 comes into close contact with the cap plate 171 and the first gasket 175 through the first nut portion 152. The connection member 176 is made of a conductive material and electrically connects the first electrode terminal 150 and the cap plate 171 to each other.

The second gasket 177 is formed between the second electrode terminal 160 and the cap plate 171 and seals a gap between the second electrode terminal 160 and the cap plate 171. The second gasket 177 may prevent external moisture from infiltrating into the secondary battery 100 or an electrolyte contained within the secondary battery 100 from leaking to the outside of the secondary battery 100. The second gasket 177 may be made of an insulating material.

The insulation plate 178 is formed such it is between the second electrode terminal 160 and the cap plate 171. In addition, the insulation plate 178 comes into close contact with an upper portion of the cap plate 171 and the peripheral area of the second electrode terminal 160. The insulation plate 178 is made of an insulating material and electrically insulates the second electrode terminal 160 from the second short-circuit plate 179 and the cap plate 171.

The second short-circuit plate 179 may be plate-shaped. In addition, the second short-circuit plate 179 is spaced from the short-circuit hole 171c and the upper portion of the first short-circuit plate 174. In other words, the second short-circuit plate 179 is formed on the insulation plate 178. In addition, the second short-circuit plate 179 is electrically connected to the second electrode terminal 160. When an internal pressure of the secondary battery 100 exceeds a preset pressure level due to overcharging of the secondary battery 100, the second short-circuit plate 179 contacts the first short-circuit plate 174 protruding to be upwardly convex, thereby causing a short-circuit. If a short-circuit is caused, a large amount of current flows, thus generating heat. In this case, the first fuse portion 123 or the second fuse portion 133 function as a fuse, thereby improving safety of the secondary battery 100.

The first insulation member 180 is formed between the cap plate 171 and the first collector plate 120. In addition, the first insulation member 180 is made of an insulating resin to allow the first collector plate 120 and the cap plate 171 to be electrically insulated. Further, the first insulation member 180 is formed to fill the inside of the first reinforcement groove 125a downwardly formed in the first reinforcement protrusion 125. Accordingly, the first insulation member 180 may further improve the structural stability of the first fuse portion 123.

The second insulation member 190 is formed between the cap plate 171 and the second collector plate 130 and is made of an insulating resin to allow the second collector plate 130 and the cap plate 171 to be electrically insulated. Further, the second insulation member 190 is formed to fill the inside of the second reinforcement groove 135a downwardly formed in the second reinforcement protrusion 135.

Accordingly, the second insulation member 190 may further improve the structural stability of the second fuse portion 133.

A configuration of a secondary battery according to another embodiment of the present invention will now be described.

Figure 4:
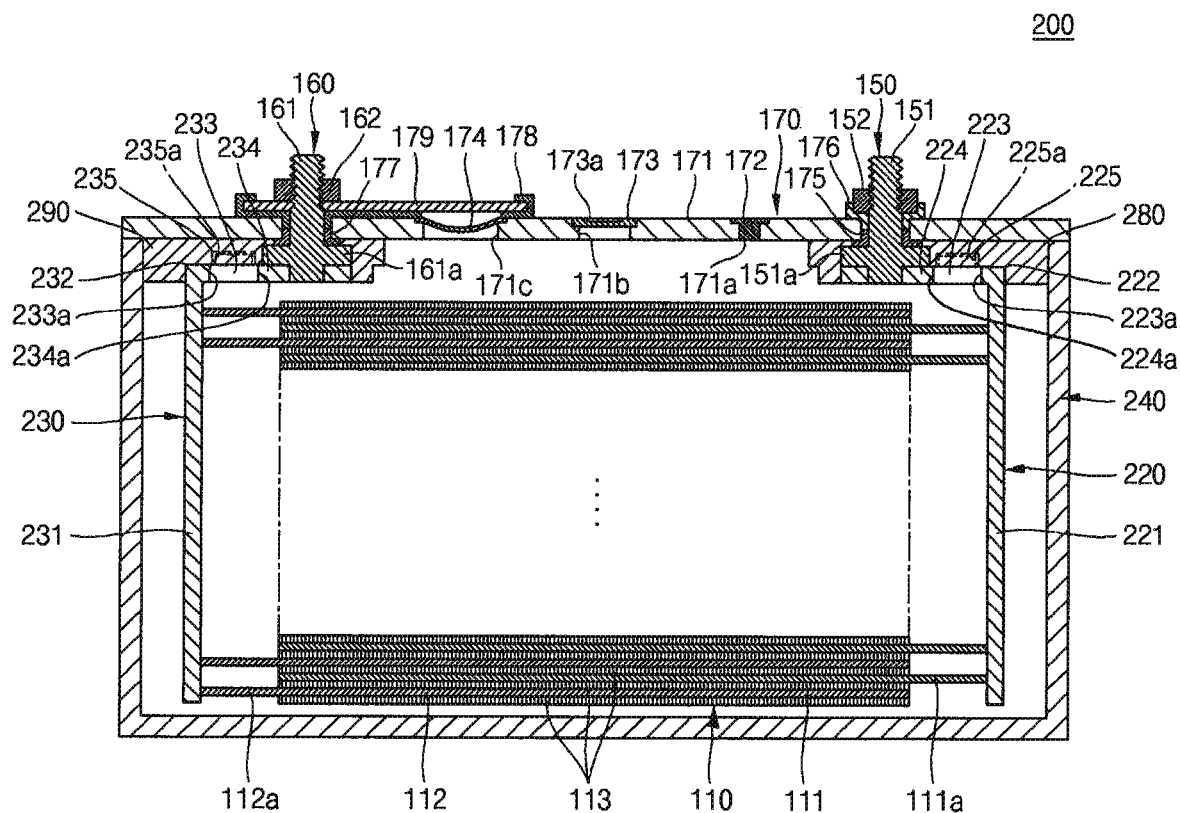
FIG. 4 is a cross-sectional view of the secondary battery according to another embodiment of the present invention.
Figure 5A:
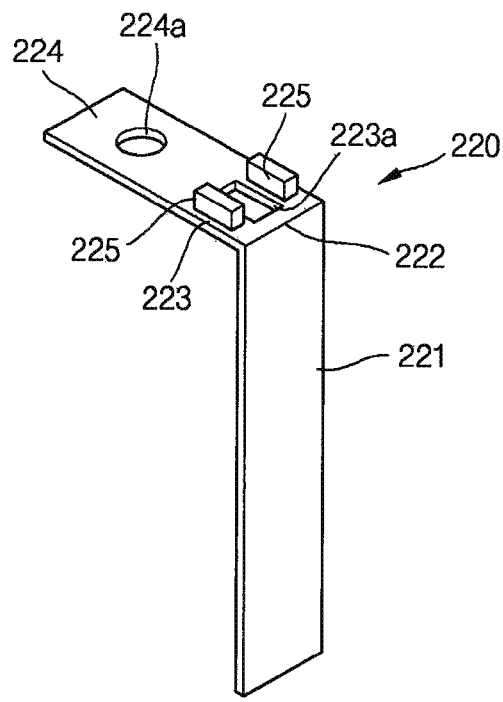
FIGS. 5A through 5C are a perspective view, a left side view and a bottom view illustrating a first collector plate shown in FIG. 4.
Figure 5B:
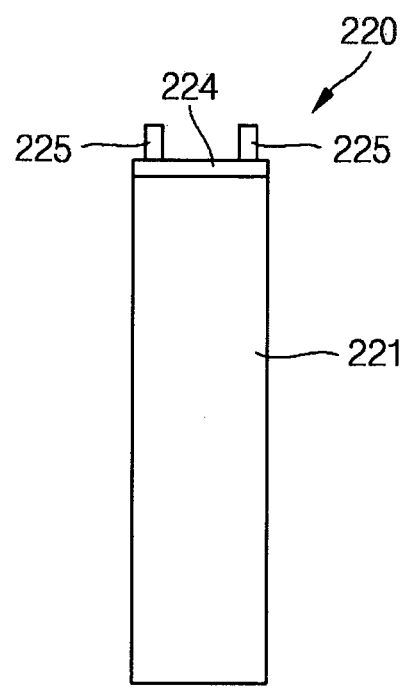
Figure 5C:
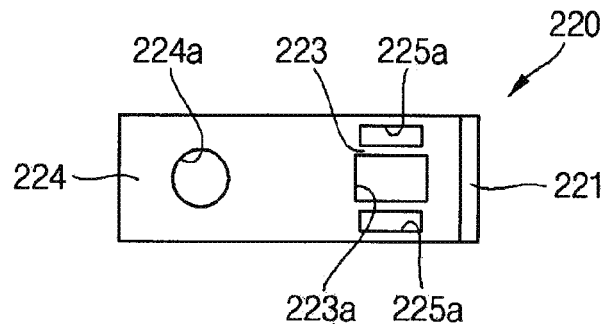

FIG. 4 is a cross-sectional view of a secondary battery according to another embodiment of the present invention, and FIGS. 5A through 5C are a perspective view, a left side view and a bottom view illustrating a first collector plate shown in FIG. 4.

Referring to FIG. 4 and FIGS. 5A through 5C, the secondary battery 200 according to the current embodiment is different from the secondary battery 100 of the previous embodiment shown in FIGS. 2 and 3A and 3B in view of configurations of a first collector plate 220, a second collector plate 230, a first insulation member 280, and a second insulation member 290. Therefore, in the following description, the secondary battery 200 will be described with regard to the first collector plate 220, the second collector plate 230, the first insulation member 280 and the second insulation member 290. For brevity, components having substantially the same or similar function as the exemplary embodiment shown in FIG. 2 and FIGS. 3A and 3B are identified by the same reference numerals, and detailed descriptions thereof will be omitted or briefly given.

The first collector plate 220 includes a first extending portion 221, a first bent portion 222, a first fuse portion 223, a first connecting portion 224, and a first reinforcement protrusion 225. In addition, the first collector plate 220 may be made of aluminum.

The first extending portion 221 may be plate-shaped and may contact a first electrode uncoated portion 111a of the first electrode 111. The first bent portion 222 is bent and extends from an upper end of the first extending portion 221.

The first fuse portion 223 may be plate-shaped and may extend from the first bent portion 222. Further, the first fuse portion 223 includes a first fuse hole 223a. Due to the first fuse hole 223a, the first fuse portion 223 of the first collector plate 220 may have a relatively small vertical sectional area. Therefore, the first fuse portion 223 is formed to have a relatively high resistance value in the first collector plate 220. Accordingly, when over-current flows in the secondary battery 200, the first fuse portion 223 may function as a fuse that prevents current flow by melting the peripheral area of the first fuse hole 223a. If an internal pressure of the secondary battery 200 exceeds a preset pressure level due to excessive heat generated by overcharging of the secondary battery 200 or decomposition of an electrolyte, the over-current may be caused by contact between a first short-circuit plate 174 and a second short-circuit plate 179. In other words, since the secondary battery 200 includes the first fuse portion 223, a risk such as a fire or explosion may be avoided by interrupting charging or discharging of the secondary battery 200.

The first connecting portion 224 extends from the first fuse portion 223. In addition, the first connecting portion 224 may include a first terminal opening 224a formed at the inside thereof.

The first reinforcement protrusion 225 may upwardly extend from the first fuse portion 223. At least one of the first reinforcement protrusions 225 may be formed to be spaced from the peripheral area of the first fuse hole 223a of the first fuse portion 223. In addition, the first reinforcement protrusion 225 may include a first reinforcement groove 225a formed at the inside thereof. The first reinforcement protrusion 225 may be formed at a location spaced from the first fuse hole 223a of the first fuse portion 223 by upwardly applying a pressure to the location. The first reinforcement protrusion 225 reinforces the strength of the first fuse portion 223, compared to a case where the first fuse portion 223 is shaped as a simple plate, thereby improving the structural stability.

The second collector plate 230 includes a second extending portion 231, a second bent portion 232, a second fuse portion 233, a second connecting portion 234, and a second reinforcement protrusion 235. The second collector plate 230 may be made of a conductive material such as nickel. The second collector plate 230 may have the same configuration as the first collector plate 220.

The second extending portion 231 may be plate-shaped and may contact the second electrode uncoated portion 112a of the second electrode 112.

The second bent portion 232 is bent and extends from an upper end of the second extending portion 231.

The second fuse portion 233 may be plate-shaped and may extend from the second bent portion 232. In addition, the second fuse portion 233 may include a second fuse hole 233a formed at the inside thereof while passing through the second fuse portion 233. Due to the second fuse hole 233a, the second fuse portion 233 of the second collector plate 230 may have a relatively small vertical sectional area. As such, when over-current flows in the secondary battery 200, the second fuse portion 233 may function as a fuse that prevents current flow by melting the peripheral area of the second fuse hole 233a. Here, the over-current may be caused by a contact between a first short-circuit plate 174 and a second short-circuit plate 179, which will later be described, when an internal pressure of the secondary battery 200 exceeds a preset pressure level due to excessive heat generated by overcharging of the secondary battery 200 or decomposition of an electrolyte. In other words, since the secondary battery 200 includes the second fuse portion 233, a risk such as a fire or explosion may be avoided by interrupting charging or discharging of the secondary battery 200. The second fuse portion 233 may be omitted in an alternative embodiment of the present invention.

The second connecting portion 234 extends from the second fuse portion 233. In addition, the second connecting portion 234 may include a second terminal opening 234a formed at the inside thereof.

The second reinforcement protrusion 235 may upwardly extend from the second fuse portion 233. At least one of the second reinforcement protrusion 235 may be formed to be spaced from the peripheral area of the second fuse hole 233a of the second fuse portion 233. In addition, the second reinforcement protrusion 235 may include a second reinforcement groove 235a formed at the inside thereof. The second reinforcement protrusion 235 may be formed at a location spaced from the second fuse hole 233a of the second fuse portion 233 by upwardly applying a pressure to the location. The second reinforcement protrusion 235 reinforces the strength of the second fuse portion 233, compared to a case where the second fuse portion 233 is shaped as a simple plate, thereby improving the structural stability. The second reinforcement protrusion 235 may be omitted when the second fuse portion 233 is omitted from the second collector plate 230.

The first insulation member 280 is formed between the cap plate 171 and the first collector plate 220. In addition, the first insulation member 280 is made of an insulating resin to allow the first collector plate 220 and the cap plate 171 to be electrically insulated. Further, the outer periphery of the first reinforcement protrusion 225 is surrounded by the first insulation member 280. Accordingly, the first insulation member 280 may further improve the structural stability of the first fuse portion 223.

The second insulation member 290 is formed between the cap plate 171 and the second collector plate 230. In addition, the second insulation member 290 is made of an insulating resin to allow the second collector plate 230 and the cap plate 171 to be electrically insulated. Further, the outer periphery of the second collector plate 230 is surrounded by the second insulation member 290. Accordingly, the second insulation member 290 may further improve the structural stability of the second fuse portion 233.

A configuration of a secondary battery according to still another embodiment of the present invention will now be described.

Figure 6:
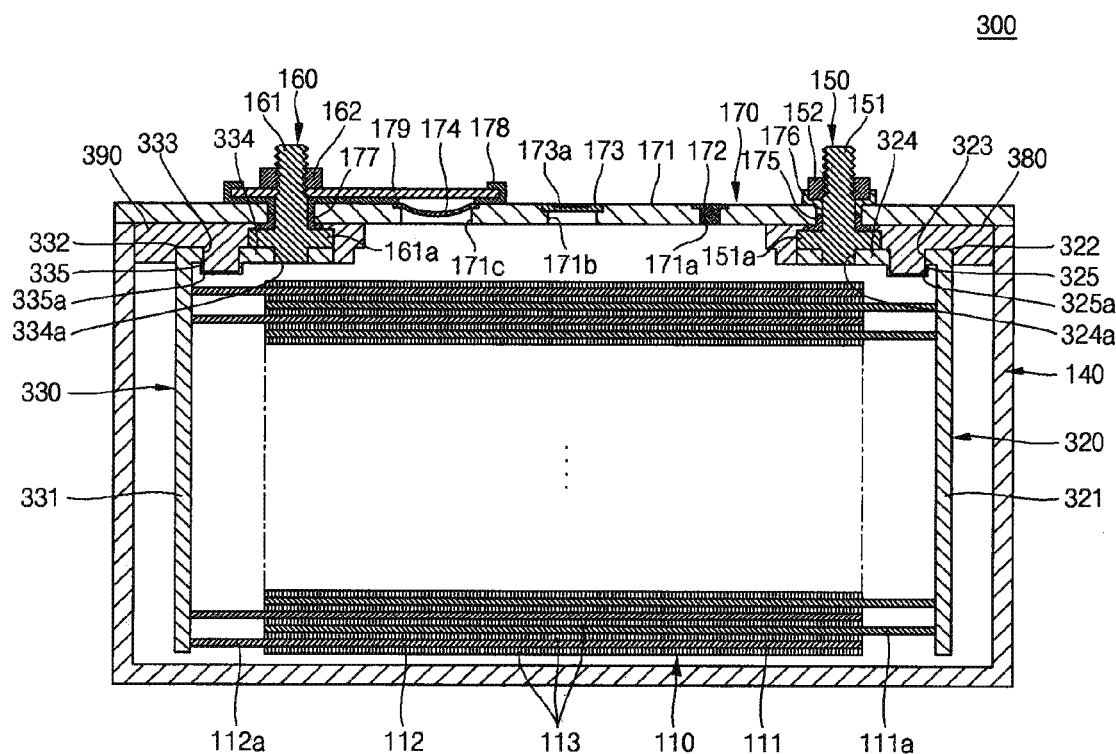
FIG. 6 is a cross-sectional view of a secondary battery according to still another embodiment of the present invention.
Figure 7A:
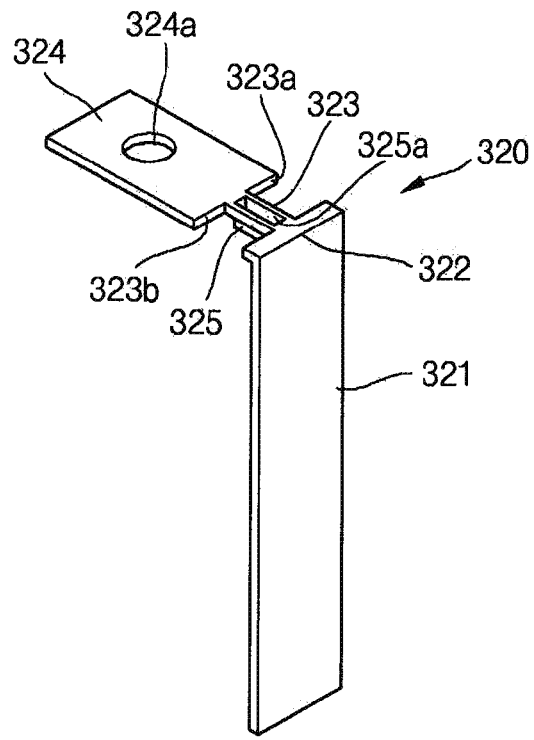
FIGS. 7A and 7B are a perspective view and a left side view illustrating a first collector plate shown in FIG. 6.
Figure 7B:
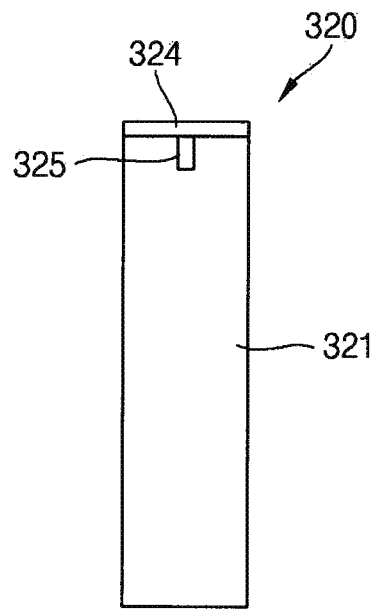

FIG. 6 is a cross-sectional view of a secondary battery according to still another embodiment of the present invention, and FIGS. 7A and 7B are a perspective view and a left side view illustrating a first collector plate shown in FIG. 6.

Referring to FIG. 6 and FIGS. 7A and 7B, the secondary battery 300 according to the current embodiment is different from the secondary battery 100 of the previous embodiment shown in FIGS. 2 and 3A and 3B in view of configurations of a first collector plate 320, a second collector plate 330, a first insulation member 380, and a second insulation member 390. Therefore, in the following description, the secondary battery 300 will be described with regard to the first collector plate 320, the second collector plate 330, the first insulation member 380 and the second insulation member 390. In addition, for brevity, components having substantially the same or similar function as the exemplary embodiment shown in FIG. 2 and FIGS. 3A and 3B are identified by the same reference numerals, and detailed descriptions thereof will be omitted or briefly given.

The first collector plate 320 includes a first extending portion 321, a first bent portion 322, a first fuse portion 323, a first connecting portion 324, and a first reinforcement protrusion 325. In addition, the first collector plate 320 may be made of aluminum.

The first extending portion 321 may be plate-shaped and may contact a first electrode uncoated portion 111a of the first electrode 111. The first bent portion 322 is bent and extends from an upper end of the first extending portion 321.

The first fuse portion 323 may be plate-shaped. In addition, the first fuse portion 323 may extend from the first bent portion 322. Further, the first fuse portion 323 includes a first outer fuse hole 323a formed at the first collector plate 320, that is, at one side of the first fuse portion 323 while passing through the one side of the first fuse portion 323, and a second outer fuse hole 323b formed at a location generally corresponding to the first outer fuse hole 323a, that is, at the other side of the first fuse portion 323 while passing through the other side of the first fuse portion 323. Due to the first outer fuse hole 323a and the second outer fuse hole 323b, the first fuse portion 323 of the first collector plate 320 may have a relatively small vertical sectional area. Therefore, the first fuse portion 323 is formed to have a relatively high resistance value in the first collector plate 320. In such a manner, when over-current flows in the secondary battery 300, the first fuse portion 323 may function as a fuse that prevents current flow by melting the peripheral area of the first fuse hole 323a. In such a manner, when over-current flows in the secondary battery 300, the first fuse portion 323 may function as a fuse that prevents current flow by melting the peripheral area of the first fuse hole 323a. Here, when an internal pressure of the secondary battery 300 exceeds a preset pressure level due to excessive heat generated by overcharging of the secondary battery 300 or decomposition of an electrolyte, the over-current may be caused by a contact between a first short-circuit plate 174 and a second short-circuit plate 179. In other words, since the secondary battery 300 includes the first fuse portion 323, a risk such as a fire or explosion may be avoided or reduced by interrupting charging or discharging of the secondary battery 300.

The first connecting portion 324 extends from the first fuse portion 323. In addition, the first connecting portion 324 may include a first terminal opening 324a formed therein.

The first reinforcement protrusion 325 may extend downwardly from the first fuse portion 323. At least one of the first reinforcement protrusion 325 may be formed to be spaced from the first outer fuse hole 323a and the second outer fuse hole 323b of the first fuse portion 323 between the first outer fuse hole 323a and the second outer fuse hole 323b. In addition, the first reinforcement protrusion 325 may include a first reinforcement groove 325a formed at the inside thereof. The first reinforcement protrusion 325 may be formed at locations spaced from the first outer fuse hole 323a and the second outer fuse hole 323b of the first fuse portion 323 between the first outer fuse hole 323a and the second outer fuse hole 323b by downwardly applying a pressure. The first reinforcement protrusion 325 reinforces the strength of the first fuse portion 323, compared to when the first fuse portion 323 is shaped as a simple plate, thereby improving the structural stability.

The second collector plate 330 includes a second extending portion 331, a second bent portion 332, a second fuse portion 333, a second connecting portion 334, and a second reinforcement protrusion 335. In addition, the second collector plate 330 may be made of a conductive material such as nickel. The second collector plate 330 may have the same configuration with the first collector plate 320.

The second extending portion 331 may be plate-shaped. In addition, the second extending portion 331 contacts the second electrode uncoated portion 112a of the second electrode 112.

The second bent portion 332 is bent and extends from an upper end of the second extending portion 331.

The second fuse portion 333 may be plate-shaped and may extend from the second bent portion 332. In addition, the second fuse portion 333 includes a third outer fuse hole formed at one side of the second fuse portion 333, and a fourth outer fuse hole at the other side of the second fuse portion 333. Due to the third and fourth outer fuse holes, the second fuse portion 333 of the second collector plate 330 has a relatively small vertical sectional area. Therefore, the second fuse portion 333 is formed to have a relatively high resistance value in the second collector plate 330. In such a manner, when over-current flows in the secondary battery 300, the second fuse portion 333 may function as a fuse that prevents current flow by melting the peripheral areas of the third and fourth outer fuse holes. Here, when an internal pressure of the secondary battery 300 exceeds a preset pressure level due to excessive heat generated by overcharging of the secondary battery 300 or decomposition of an electrolyte, the over-current may be caused by a contact between a first short-circuit plate 174 and a second short-circuit plate 179. In other words, since the secondary battery 300 includes the second fuse portion 333, a risk such as a fire or explosion may be avoided by interrupting charging or discharging of the secondary battery 300. The second fuse portion 333 may be omitted in alternative embodiments of the present invention.

The second connecting portion 334 extends from the second fuse portion 333. In addition, the second connecting portion 334 may include a second terminal opening 334a formed at the inside thereof.

The second reinforcement protrusion 335 may extend downwardly from the second fuse portion 333. At least one of the second reinforcement protrusion 335 may be formed to be spaced from the third outer fuse hole and the fourth outer fuse hole of the second fuse portion 333 between the third outer fuse hole and the fourth outer fuse hole. In addition, the second reinforcement protrusion 335 may include a second reinforcement groove 335a formed at the inside thereof. The second reinforcement protrusion 335 may be formed at locations spaced from the third outer fuse hole and the fourth outer fuse hole between the third outer fuse hole and the fourth outer fuse hole of the second fuse portion 333 by downwardly applying a pressure to the locations. The second reinforcement protrusion 335 reinforces the strength of the second fuse portion 334, compared to when the second fuse portion 334 is shaped as a simple plate, thereby improving the structural stability. The second reinforcement protrusion 335 may omitted when the second fuse portion 333 is omitted from the second collector plate 330.

The first insulation member 380 is formed between the cap plate 171 and the first collector plate 320. In addition, the first insulation member 380 is made from an insulating resin to allow the first collector plate 320 and the cap plate 171 to be electrically insulated. Further, the first insulation member 380 is formed to fill the inside of the first reinforcement groove 325a formed in the first reinforcement protrusion 325. Accordingly, the first insulation member 380 may further improve the structural stability of the first fuse portion 323.

The second insulation member 390 is formed between the cap plate 171 and the second collector plate 330. In addition, the second insulation member 390 is made of an insulating resin to allow the second collector plate 330 and the cap plate 171 to be electrically insulated. Further, the second insulation member 390 is formed to fill the inside of the second reinforcement groove 335a formed in the second reinforcement protrusion 335. Accordingly, the second insulation member 390 may further improve the structural stability of the second fuse portion 333.

A configuration of a secondary battery according to still another embodiment of the present invention will now be described.

Figure 8:
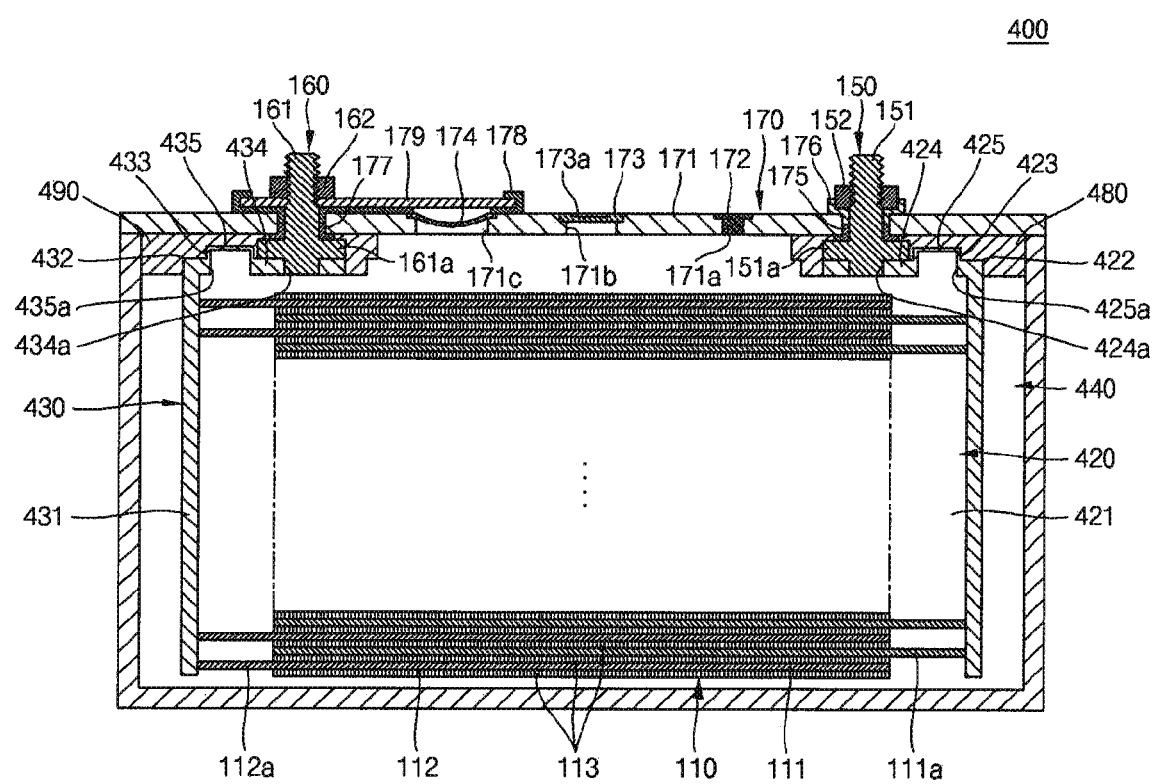
FIG. 8 is a cross-sectional view of a secondary battery according to still another embodiment of the present invention.
Figure 9A:
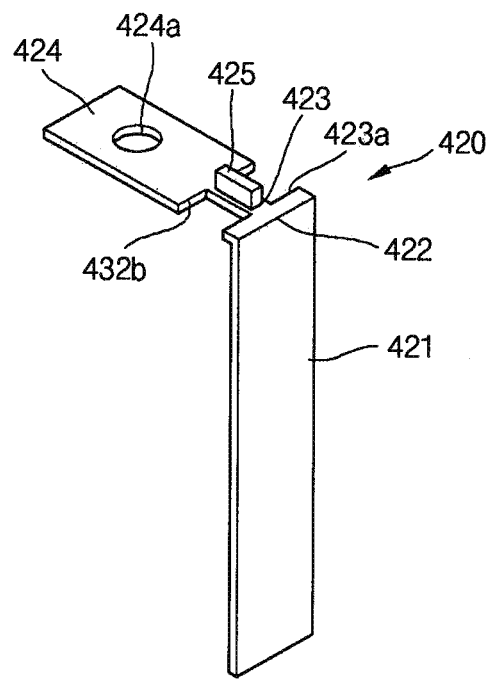
FIGS. 9A through 9C are a perspective view, a left side view and a bottom view illustrating a first collector plate shown in FIG. 8.
Figure 9B:
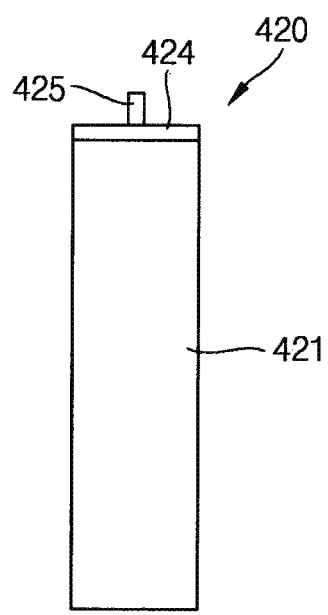
Figure 9C:
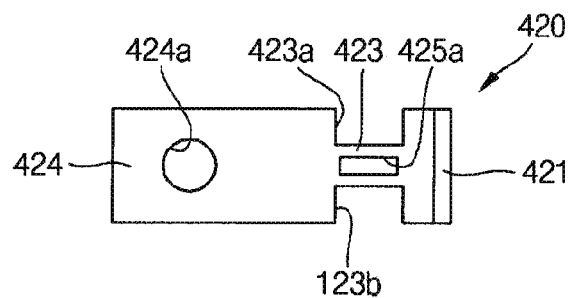

FIG. 8 is a cross-sectional view of a secondary battery according to still another embodiment of the present invention, and FIGS. 9A through 9C are a perspective view, a left side view and a bottom view illustrating a first collector plate shown in FIG. 8.

Referring to FIG. 8 and FIGS. 9A through 9C, the secondary battery 400 according to the current embodiment is different from the secondary battery 100 of the previous embodiment shown in FIGS. 2 and 3A and 3B in view of configurations of a first collector plate 420, a second collector plate 430, a first insulation member 480, and a second insulation member 490. Therefore, in the following description, the secondary battery 400 will be described with regard to the first collector plate 420, the second collector plate 430, the first insulation member 480 and the second insulation member 490. For brevity, components having substantially the same or similar function as the exemplary embodiment shown in FIG. 2 and FIGS. 3A and 3B are identified by the same reference numerals, and detailed descriptions thereof will be omitted or briefly given.

The first collector plate 420 includes a first extending portion 421, a first bent portion 422, a first fuse portion 423, a first connecting portion 424, and a first reinforcement protrusion 425. The first collector plate 420 may be made of aluminum.

The first extending portion 421 may be plate-shaped. In addition, the first extending portion 421 contacts a first electrode uncoated portion 111a of the first electrode 111.

The first bent portion 422 is bent and extends from an upper end of the first extending portion 421. The first fuse portion 423 may be plate-shaped. In addition, the first fuse portion 423 extends from the first bent portion 422. Further, the first fuse portion 423 includes a first outer fuse hole 423a formed at the first collector plate 420, that is, at one side of the first fuse portion 423 while passing through the one side of the first fuse portion 423, and a second outer fuse hole 423b formed at a location corresponding to the first outer fuse hole 423a, that is, at the other side of the first fuse portion 423 while passing through the other side of the first fuse portion 423. Due to the first outer fuse hole 423a and the second outer fuse hole 423b, the first fuse portion 423 of the first collector plate 420 may have a relatively small vertical sectional area. Therefore, the first fuse portion 423 is formed to have a relatively high resistance value in the first collector plate 420. In such a manner, when over-current flows in the secondary battery 400, the first fuse portion 323 may function as a fuse that prevents current flow by melting the peripheral area of the first fuse hole 323a. In such a manner, when over-current flows in the secondary battery 400, the first fuse portion 423 may function as a fuse that prevents current flow by melting the peripheral area of the first fuse hole 423a. Here, when an internal pressure of the secondary battery 400 exceeds a preset pressure level due to excessive heat generated by overcharging of the secondary battery 400 or decomposition of an electrolyte, the over-current may be caused by a contact between a first short-circuit plate 174 and a second short-circuit plate 179. In other words, since the secondary battery 400 includes the first fuse portion 423, a risk such as a fire or explosion may be avoided or reduced by interrupting charging or discharging of the secondary battery 400.

The first connecting portion 424 extends from the first fuse portion 423. In addition, the first connecting portion 424 may include a first terminal opening 424a formed therein.

The first reinforcement protrusion 425 may extend upwardly from the first fuse portion 423. At least one of the first reinforcement protrusion 425 may be formed to be spaced from the first outer fuse hole 423a and the second outer fuse hole 423b of the first fuse portion 423 between the first outer fuse hole 423a and the second outer fuse hole 423b. In addition, the first reinforcement protrusion 425 may include a first reinforcement groove 425a formed at the inside thereof. The first reinforcement protrusion 425 may be formed at locations spaced from the first outer fuse hole 423a and the second outer fuse hole 423b of the first fuse portion 423 between the first outer fuse hole 423a and the second outer fuse hole 423b by upwardly applying a pressure. The first reinforcement protrusion 425 reinforces the strength of the first fuse portion 423, compared to a case where the first fuse portion 423 is shaped as a simple plate, thereby improving the structural stability.

The second collector plate 430 includes a second extending portion 431, a second bent portion 432, a second fuse portion 433, a second connecting portion 434, and a second reinforcement protrusion 435. In addition, the second collector plate 430 may be made of a conductive material such as nickel. The second collector plate 430 may have the same configuration with the first collector plate 420.

The second extending portion 431 may be plate-shaped and may contact the second electrode uncoated portion 112a of the second electrode 112.

The second bent portion 432 is bent and extends from an upper end of the second extending portion 431.

The second fuse portion 433 may be plate-shaped. In addition, the second fuse portion 433 extends from the second bent portion 432. In addition, the second fuse portion 433 includes a third outer fuse hole formed at the second collector plate 430, that is, at one side of the second fuse portion 433 while passing through the one side of the second fuse portion 433, and a fourth outer fuse hole formed at a location corresponding to the third outer fuse hole, that is, at the other side of the second fuse portion 433 while passing through the other side of the second fuse portion 433. Due to the third outer fuse hole and the fourth outer fuse hole, the second fuse portion 433 of the second collector plate 430 may have a relatively small vertical sectional area. Therefore, the second fuse portion 433 is formed to have a relatively high resistance value in the second collector plate 430. In such a manner, when over-current flows in the secondary battery 400, the second fuse portion 433 may function as a fuse that prevents current flow by melting the peripheral areas of the third and fourth outer fuse holes. Here, when an internal pressure of the secondary battery 400 exceeds a preset pressure level due to excessive heat generated by overcharging of the secondary battery 100 or decomposition of an electrolyte, the over-current may be caused by a contact between a first short-circuit plate 174 and a second short-circuit plate 179, which will later be described. In other words, a risk such as a fire or explosion may be avoided or reduced by interrupting charging or discharging of the secondary battery 400. The second fuse portion 433 may be omitted in alternative embodiments of the present invention.

The second connecting portion 434 extends from the second fuse portion 433. The second connecting portion 434 may include a second terminal opening 434a formed at the inside thereof.

The second reinforcement protrusion 435 may upwardly extend from the second fuse portion 433. At least one of the second reinforcement protrusion 435 may be formed at a third outer fuse hole and a fourth outer fuse hole to be spaced from the third outer fuse hole and the fourth outer fuse hole. In addition, the second reinforcement protrusion 435 may include a second reinforcement groove 435a formed therein. The second reinforcement protrusion 435 may be formed by applying a pressure upwardly to locations spaced from the third outer fuse hole and the fourth outer fuse hole. The second reinforcement protrusion 435 reinforces the strength of the second fuse portion 434, compared to a case where the second fuse portion 434 is shaped as a simple plate, thereby improving the structural stability. The second reinforcement protrusion 435 may not be formed when the second fuse portion 433 is not formed in the second collector plate 430.

The first insulation member 480 is formed between the cap plate 171 and the first collector plate 420. In addition, the first insulation member 480 is made of an insulating resin to allow the first collector plate 420 and the cap plate 171 to be electrically insulated. Further, the outer periphery of the first reinforcement protrusion 425 is surrounded by the first insulation member 480. Accordingly, the first insulation member 480 may further improve the structural stability of the first fuse portion 423.

The second insulation member 490 is formed between the cap plate 171 and the second collector plate 430. In addition, the second insulation member 490 is made of an insulating resin to allow the second collector plate 430 and the cap plate 171 to be electrically insulated. Further, the outer periphery of the second reinforcement protrusion 435 is surrounded by the second insulation member 490. Accordingly, the second insulation member 490 may further improve the structural stability of the second fuse portion 433.

A configuration of a secondary battery according to still another embodiment of the present invention will now be described.

Figure 10:
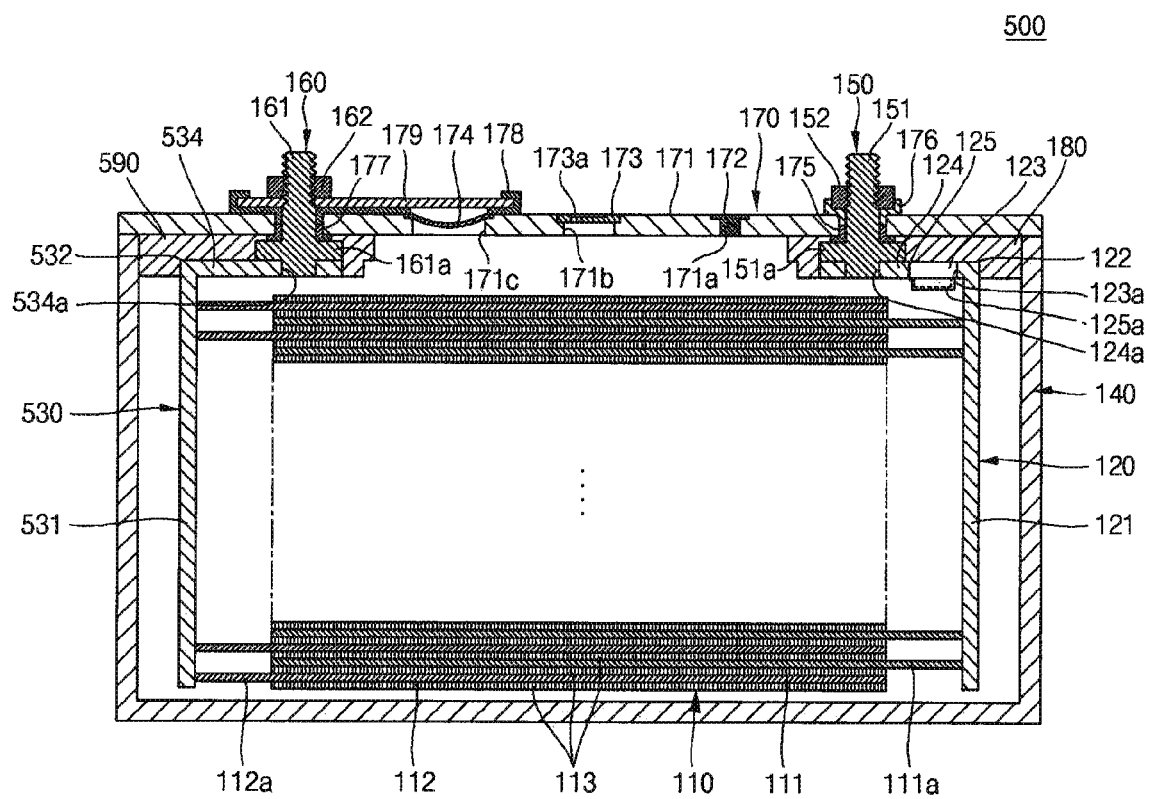
FIG. 10 is a cross-sectional view of a secondary battery according to still another embodiment of the present invention.

FIG. 10 is a cross-sectional view of a secondary battery according to still another embodiment of the present invention.

Referring to FIG. 10, the secondary battery 500 according to the current embodiment is different from the secondary battery 100 of the previous embodiment shown in FIGS. 2 and 3A and 3B in view of configurations of a second collector plate 530 and a second insulation member 590. Therefore, in the following description, the secondary battery 500 will be described with regard to the second collector plate 530 and the second insulation member 590. For brevity, components having substantially the same or similar function as the exemplary embodiment shown in FIG. 2 and FIGS. 3A and 3B are identified by the same reference numerals, and detailed descriptions thereof will be omitted or briefly given.

The second collector plate 530 includes a second extending portion 531, a second bent portion 532, and a second connecting portion 534.

The second extending portion 531 may be plate-shaped and may contact the first electrode uncoated portion 111a of the first electrode 111.

The second bent portion 532 is bent and extends from an upper end of the second extending portion 531. The second connecting portion 534 extends from the second bent portion 532. In addition, the second connecting portion 534 may include a second terminal opening 534a formed at the inside thereof.

The second insulation member 590 is formed between the cap plate 171 and the second collector plate 530. In addition, the second insulation member 590 is made of an insulating resin to allow the second collector plate 530 and the cap plate 171 to be electrically insulated.

As described above, in the secondary battery 500 according to the current embodiment, the first fuse portion 123 is formed only at the first collector plate 120, while no fuse portion is formed at the second collector plate 530. The first fuse portion 123 of the first collector plate 120, which is made of aluminum, has a lower melting point than the second collector plate 530, which is made of nickel. Therefore, in the secondary battery 500 according to the current embodiment, the same fuse function as that of the secondary battery 100 according to the previous embodiment can be exerted even without forming a fuse portion at the second collector plate 530.

Although the present invention has been described with reference to certain exemplary embodiments thereof, it will be understood by those skilled in the art that a variety of modifications and variations may be made to the present invention without departing from the spirit or scope of the present invention defined in the appended claims, and their equivalents.

What is claimed is:

1. A secondary battery comprising:
   an electrode assembly comprising a first electrode, a second electrode, and a separator located between the first electrode and the second electrode;
   a first collector plate electrically coupled to the first electrode, wherein the first collector plate has a first fuse hole and comprises at least one first reinforcement protrusion having a first reinforcement groove and being spaced from the first fuse hole;
   a second collector plate electrically coupled to the second electrode;
   a case housing the electrode assembly, the first collector plate and the second collector plate, the case having an upper opening; and
   a cap assembly sealing the upper opening of the case.

2. The secondary battery of claim 1, wherein the first collector plate further comprises:
   a first extending portion contacting the first electrode;
   a first bent portion extending at an angle from the first extending portion;
   a first fuse portion extending from the first bent portion, the first fuse portion including the first fuse hole and the first reinforcement protrusion; and
   a first connecting portion extending from the first fuse portion.

3. The secondary battery of claim 1, further comprising:
   a first electrode terminal electrically coupled to the first collector plate and protruding through the cap assembly; and
   a second electrode terminal electrically coupled to the second collector plate and protruding through the cap assembly.

4. The secondary battery of claim 3, wherein the cap assembly comprises:
   a cap plate sealing an open upper end of the case and having a short-circuit hole formed thereon, wherein the first electrode terminal and the second electrode terminal protrude therethrough;
   a first short-circuit plate sealing the short-circuit hole and having a convex shape protruding generally towards the electrode assembly; and
   a second short-circuit plate electrically coupled to the second electrode terminal and spaced from the first short-circuit plate.

5. The secondary battery of claim 2, wherein the first reinforcement protrusion extends generally towards the electrode assembly from the first fuse portion.

6. The secondary battery of claim 5, wherein a first insulation member is located between the first collector plate and the cap assembly, and wherein the first insulation member is in the first reinforcement groove.

7. The secondary battery of claim 2, wherein the first reinforcement protrusion extends from the first fuse portion in a direction generally away from the electrode assembly.

8. The secondary battery of claim 7, wherein a first insulation member is formed between the first collector plate and the cap assembly, and the outer periphery of the first reinforcement protrusion is surrounded by the first insulation member.

9. The secondary battery of claim 1, wherein the second collector plate has a second fuse hole; and wherein the second collector plate comprises at least one second reinforcement protrusion including a second reinforcement groove and spaced from the second fuse hole.

10. The secondary battery of claim 9, wherein the second collector plate further comprises:
    a second extending portion contacting the second electrode;
    a second bent portion extending at an angle from the second extending portion;
    a second fuse portion extending from the second bent portion and including the second fuse hole and the second reinforcement protrusion; and
    a second connecting portion extending from the second fuse portion.

11. A secondary battery comprising:
    an electrode assembly including a first electrode, a second electrode, and a separator between the first electrode and the second electrode;
    a first collector plate electrically coupled to the first electrode and having a first outer fuse hole and a second outer fuse hole, wherein the first collector plate comprises at least one first reinforcement protrusion including a first reinforcement groove, the at least one first reinforcement protrusion being located between and being spaced from the first outer fuse hole and the second outer fuse hole;

a second collector plate electrically coupled to the second electrode;

a case accommodating the electrode assembly, the first collector plate and the second collector plate and having an opening; and a cap plate sealing the upper opening of the case.

12. The secondary battery of claim 11, wherein the first collector plate further comprises:

a first extending portion contacting the first electrode;

a first bent portion extending at an angle from the first extending portion;

a first fuse portion extending from the first bent portion and including the first outer fuse hole, the second outer fuse hole and the first reinforcement protrusion; and a first connecting portion extending from the first fuse portion.

13. The secondary battery of claim 11, further comprising:

a first electrode terminal electrically coupled to the first collector plate and protruding outwardly through the cap assembly; and a second electrode terminal electrically coupled to the second collector plate and protruding outwardly from the cap assembly.

14. The secondary battery of claim 13, wherein the cap assembly comprises:

a cap plate sealing an open upper end of the case and having a short-circuit hole, wherein the first electrode terminal and the second electrode terminal protrude through the cap plate;

a first short-circuit plate sealing the short-circuit hole and having a convex shape extending generally toward the electrode assembly; and a second short-circuit plate electrically coupled to the second electrode terminal and spaced from the first short-circuit plate.

15. The secondary battery of claim 12, wherein the first reinforcement protrusion extends generally toward the electrode assembly from the first fuse portion.

16. The secondary battery of claim 15, wherein a first insulation member is located between the first collector plate and the cap assembly, wherein the first insulation member is in the first reinforcement groove.

17. The secondary battery of claim 12, wherein the first reinforcement protrusion extends from the first fuse portion in a direction generally away from the electrode assembly.

18. The secondary battery of claim 17, wherein a first insulation member is located between the first collector plate and the cap assembly and surrounds a periphery of the first reinforcement protrusion.

19. The secondary battery of claim 11, wherein the second collector plate has a third outer fuse hole and a fourth outer fuse hole; and wherein the second collector plate comprises at least one second reinforcement protrusion having a second reinforcement groove, the at least one second reinforcement protrusion being between and being spaced from the third outer fuse hole and the fourth outer fuse hole.

20. The secondary battery of claim 19, wherein the second collector plate comprises:

a second extending portion contacting the second electrode;

a second bent portion extending at an angle from the second extending portion;

a second fuse portion extending from the second bent portion and including the third and fourth outer fuse hole and the second reinforcement protrusion; and a second connecting portion extending from the second fuse portion.

* * * * *